United States Patent
Mittal et al.

(10) Patent No.: US 10,621,166 B2
(45) Date of Patent: Apr. 14, 2020

(54) INTERACTIVE DIALOG IN NATURAL LANGUAGE USING AN ONTOLOGY

(71) Applicant: International Business Machines Corporation, Armonk, NY (US)

(72) Inventors: Ashish R. Mittal, Bangalore (IN); Diptikalyan Saha, Bangalore (IN); Karthik Sankaranarayanan, Bangalore (IN); Jaydeep Sen, West Bengal (IN)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 15/467,291

(22) Filed: Mar. 23, 2017

(65) Prior Publication Data

US 2018/0276273 A1 Sep. 27, 2018

(51) Int. Cl.
 *G06F 7/00* (2006.01)
 *G06F 16/242* (2019.01)
 *G06F 17/27* (2006.01)

(52) U.S. Cl.
 CPC ........ *G06F 16/243* (2019.01); *G06F 17/2785* (2013.01)

(58) Field of Classification Search
 CPC .................................................. G06F 16/243
 USPC ........................................................ 707/722
 See application file for complete search history.

(56) References Cited

U.S. PATENT DOCUMENTS

| | | | |
|---|---|---|---|
| 6,044,347 A | 3/2000 | Abella et al. | |
| 6,246,981 B1 | 6/2001 | Papineni et al. | |
| 6,625,613 B2 | 9/2003 | Thompson | |
| 6,785,651 B1 | 8/2004 | Wang | |
| 7,069,220 B2 | 6/2006 | Coffman et al. | |
| 9,201,923 B2 | 12/2015 | Weng et al. | |
| 2011/0125734 A1* | 5/2011 | Duboue et al. | 707/723 |
| 2014/0081633 A1 | 3/2014 | Badaskar | |
| 2015/0032443 A1* | 1/2015 | Karov et al. | 704/9 |
| 2016/0260433 A1 | 9/2016 | Sumner et al. | |

OTHER PUBLICATIONS

Bobrow et al. Gus, A Frame-Driven Dialog Systems; Artificial Intelligence 8 (1977), pp. 155-173.
Fernandez et al. Classifying Non-sentential Utterances in Dialogue: A Machine Learning Approach, Computational Linguistics 33.3 (2007): 397-427.

* cited by examiner

*Primary Examiner* — Alexandria Y Bromell
(74) *Attorney, Agent, or Firm* — Ryan, Mason & Lewis, LLP

(57) ABSTRACT

Methods, systems, and computer program products for carrying out interactive dialog in natural language using an ontology are provided herein. A computer-implemented method includes generating one or more domain-driven interpretations of a natural language dialogue query provided by a user via utilization of a web ontology language; determining multiple structured base queries, from among a stored collection of structured queries, that correspond to the natural language dialogue query, in view of the one or more generated domain-driven interpretations; selecting one of the multiple determined structured base queries, based on one or more items of context information pertaining to the dialogue; automatically generating a response to the selected structured base query; and outputting the generated response to the user.

16 Claims, 7 Drawing Sheets

INTERACTIVE DIALOG IN NATURAL LANGUAGE USING AN ONTOLOGY

FIELD

The present application generally relates to information technology, and, more particularly, to query processing techniques.

BACKGROUND

Attempting to carry out interactive dialogue in natural language over structured query languages presents multiple challenges. For example, existing interactive dialogue approaches do not include domain-driven dialogue interpretation, cannot process dialogue with more than few queries over a base query, and cannot handle complex dialogue questions due to a lack of context.

SUMMARY

In one embodiment of the present invention, techniques for carrying out interactive dialog in natural language using an ontology are provided. An exemplary computer-implemented method can include generating one or more domain-driven interpretations of a natural language dialogue query provided by a user via utilization of a web ontology language; determining multiple structured base queries, from among a stored collection of structured queries, that correspond to the natural language dialogue query, in view of the one or more generated domain-driven interpretations; selecting one of the multiple determined structured base queries, based on one or more items of context information pertaining to the dialogue; automatically generating a response to the selected structured base query; and outputting the generated response to the user.

In another embodiment of the invention, an exemplary computer-implemented method can include steps of generating one or more domain-driven interpretations of a second natural language dialogue query provided by the user via utilization of a web ontology language, wherein the second natural language dialogue query is provided by the user subsequent to the first natural language dialogue query, and wherein the second natural language dialogue query is substantively related to the first natural language dialogue query. Such an embodiment also includes determining multiple structured base queries, from among a stored collection of structured queries, that correspond to the second natural language dialogue query, based on the one or more generated domain-driven interpretations, and selecting one of the multiple determined structured base queries that correspond to the second natural language dialogue query, based on one or more items of context information pertaining to the dialogue, wherein the one or more items of context information comprise the one or more domain-driven interpretations of the first natural language dialogue query. Further, such an embodiment can additionally include automatically generating a response to the selected structured base query that corresponds to the second natural language dialogue query, and outputting, to the user, the generated response to the selected structured base query that corresponds to the second natural language dialogue query.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
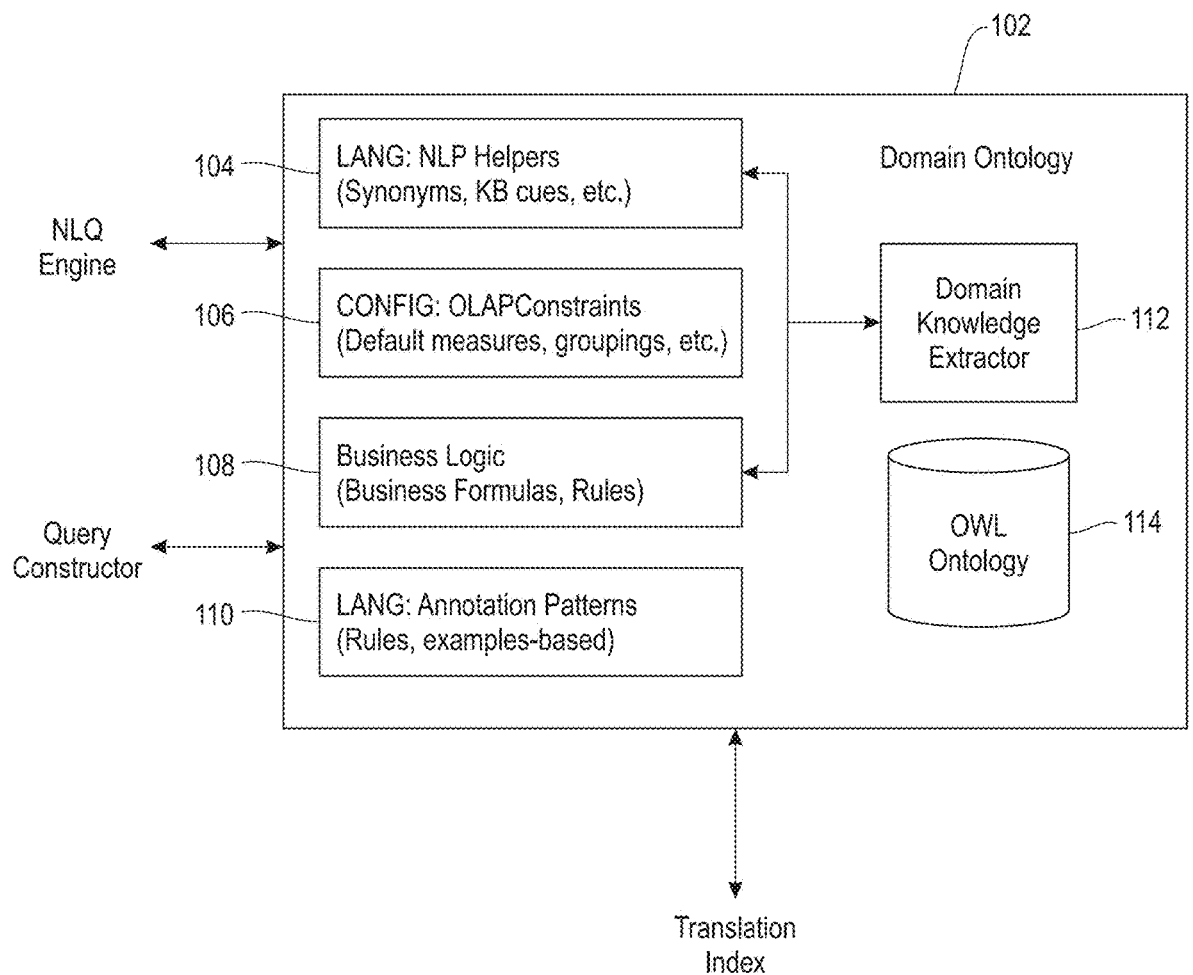
FIG. 1 is a diagram illustrating domain ontology, according to an exemplary embodiment of the invention.

As described herein, an embodiment of the present invention includes carrying out interactive dialog in natural language using an ontology. Natural language processing (NLP), as further detailed herein, pertains to analyzing and managing interactions between computing devices and man-made and/or human languages. At least one embodiment of the invention includes processing arbitrary dialogue scenarios which cannot be handled through template-driven systems. For example, consider the query, "show me flights from Boston to New York." Follow-up questions to such a query can be arbitrary, such as, for example, "show me only the three cheapest flights," "does the second identified flight include meals," "are there any stop-overs," "which flights include a lounge facility," etc.

Pre-defined templates, such as used by existing dialogue approaches, cannot capture all possible scenarios. Additionally, in such approaches, context typically does not include previous responses (such as, for example, the above-noted follow-up query of "does the second identified flight include meals"). However, one or more embodiments of the invention include an ontology-driven resolution of non-sequential utterances (NSUs) that can create and/or update interpretation sub-graphs (related to a query) as necessary in the context of existing interpretations. In such an embodiment, pre-defined templates are not required, and ambiguity is not carried from the context while resolving the NSUs. As detailed further herein, at least one embodiment of the invention can include implementing interpretation-based ranking to limit the disambiguation choices for the user.

One or more embodiments of the invention include disambiguating NSUs with the user with respect, for example, to defaults, named entity values, query interpretations, context (to identify the relevant context for the given NSU with respect to the depth of context), and/or interpretation versus answer response. Accordingly, such an embodiment includes carrying out interactive dialogue in natural language over structured query languages via domain-driven interpretation of complex natural language dialogue queries and translation to one or more structured queries with respect to corresponding context information. In using structured query language, one or more embodiments of the invention can include storing context information, which can result in the ability to handle and/or process arbitrary-length dialogue. Saving context information in the form of structured query language and using a standard web ontology language (such as, OWL2, for example) to generate interpretations can result in ascertaining query meanings with greater accuracy.

Additionally, using context information and domain-driven interpretations, at least one embodiment of the invention can include resolving dialogue requirements and supporting more generic dialogue scenarios. More specifically, such an embodiment can include generating domain-driven interpretations for dialogue queries, and using such interpretations in conjunction with context information to resolve ambiguities in determining the correct meaning of the dialogue phrase(s) with respect to the base query. As used herein, a "base query" refers to a set of previously-asked queries which serve as the basis of the next query in a conversation. Accordingly, a query in conversation can depend on the set of queries asked before it, and such a set of queries is referred to as a "base query."

As used herein, ontology refers to a model for describing items, wherein such a model includes a set of types, properties, and relationship types. Additionally, a knowledge graph refers to a semantic network containing facts about relationships between different objects. As also used herein, NSUs refer to fragmentary utterances that do not have the form of a full sentence, according to most traditional grammars, but that nevertheless convey a complete clausal meaning. Such utterances are a common phenomenon in spoken dialogue. For example, consider an example statement such as "Dave did not come to the office." An example NSU, in connection with such a statement, might include the utterance, "Why?" Accordingly, NSUs may not have a complete sentential form, but can rely heavily on the previous questions and/or statements (also referred to herein as context).

Further, as used herein, query context refers to the last and/or previous successful interpretation, in addition to a related answer response, and also in addition to all related unsuccessful interpretations. Also, the depth of context can include the amount of related context and/or historical information.

Accordingly, and as detailed herein, at least one embodiment of the invention includes automatically translating a complex natural language dialogue query to a structured query, based on one or more domain-driven interpretations. Such an embodiment can include utilizing a web ontology language for domain-driven interpretation by using concepts, relations, properties, allowed values, etc., to relate the dialog query with a base query which has been previously queried/stored in a database. As used herein, domain driven interpretation refers to finding a connected ontology sub-graph from a natural language query at run-time, wherein the sub-graph interprets the natural language query and can be used to formulate a back-end query which can answer the user query. More specifically, in generating a domain driven interpretation, one or more embodiments of the invention include finding a connected ontology sub-graph that can answer a natural language query asked by the user. In the case of follow-up queries and/or non-sequential utterances put forth by the user, at least one embodiment of the invention can include identifying the most relevant semantically-related base query from the dialog session and using that interpretation as the context for re-interpreting the dialog query.

Specifically, using a domain-specific ontology, one or more embodiments of the invention can include identifying the most relevant semantically-related base query. For example, consider the following example query/NSU conversation: "Show me flights from Atlanta to New York," "with a meal," "with no stopovers," "in the morning." Using this example conversation, and noting that the last query is "in the morning," then, via the domain-specific ontology, one or more embodiments of the invention can include deducing and/or identifying flights having time information but not "meal" or "stopover" information. This helps in associating the conversation query to the most relevant query(ies) pertaining to "flights."

As such, one or more embodiments of the invention can include identifying a related query with respect to the context of the dialog query and generating the structured query handling an arbitrary length dialogue. Because one or more embodiments of the invention performing the interpretation at run-time, previous interpretation context information can be used to create the next and/or subsequent interpretation. Such an embodiment can include re-using the disambiguation from previous queries. Accordingly, for a follow-up dialog query, one or more embodiments of the invention can include determining the most relevant semantically-related query among the previous queries in the same dialog session, and using the previous query context in re-interpreting the dialog query.

FIG. 1 is a diagram illustrating domain ontology, according to an exemplary embodiment of the invention. By way of illustration, FIG. 1 depicts a domain ontology component 102 that includes a first language component 104 (which includes NLP helpers such as synonyms, knowledge-based cues, etc.), a configuration component 106 (which includes online analytical processing constraints such as default measures, groupings, etc.), a business logic component 108 (which includes business formulas, rules, etc.), and a second language component 110 (which includes annotation patterns such as rule-based patterns, example-based patterns, etc.). Additionally, the domain ontology component 102 also includes a domain knowledge extractor 112 and an ontology database 114. Further, as illustrated in FIG. 1, and as further detailed herein, the domain ontology component 102 interacts with a natural language query (NLQ) engine, a query constructor, and a translation index.

The first language component 104 performs language understanding tasks using synonyms to ontology elements, knowledge base values, their associations, etc. The configuration component 106, using the output of the first language component 104, checks to see if more information is to be associated with the query or if some default measure is to be added. For example, if the query is "Show me loans," configuration component 106 can decide to use loan amount as the default measure for the query term "loans." The business logic component 108 uses the output from configuration component 106 to encode business logic. For example, for a query "Show me loans," business logic component 108 determines a need to aggregate the loan amount based on quarters. Additionally, the second language component 110 takes information from business logic component 108 and uses the ontology 114 to create one or more semantic patterns of the query. These patterns include one or more interpretations of the query in the context of the ontology 114.

Also, the domain knowledge extractor 112 stores all domain-specific knowledge (rules, constraints, default measures, etc.), and the ontology 114, as noted above, includes a domain-specific ontology which models the domain-specific information using an OWL standard.

Figure 2:
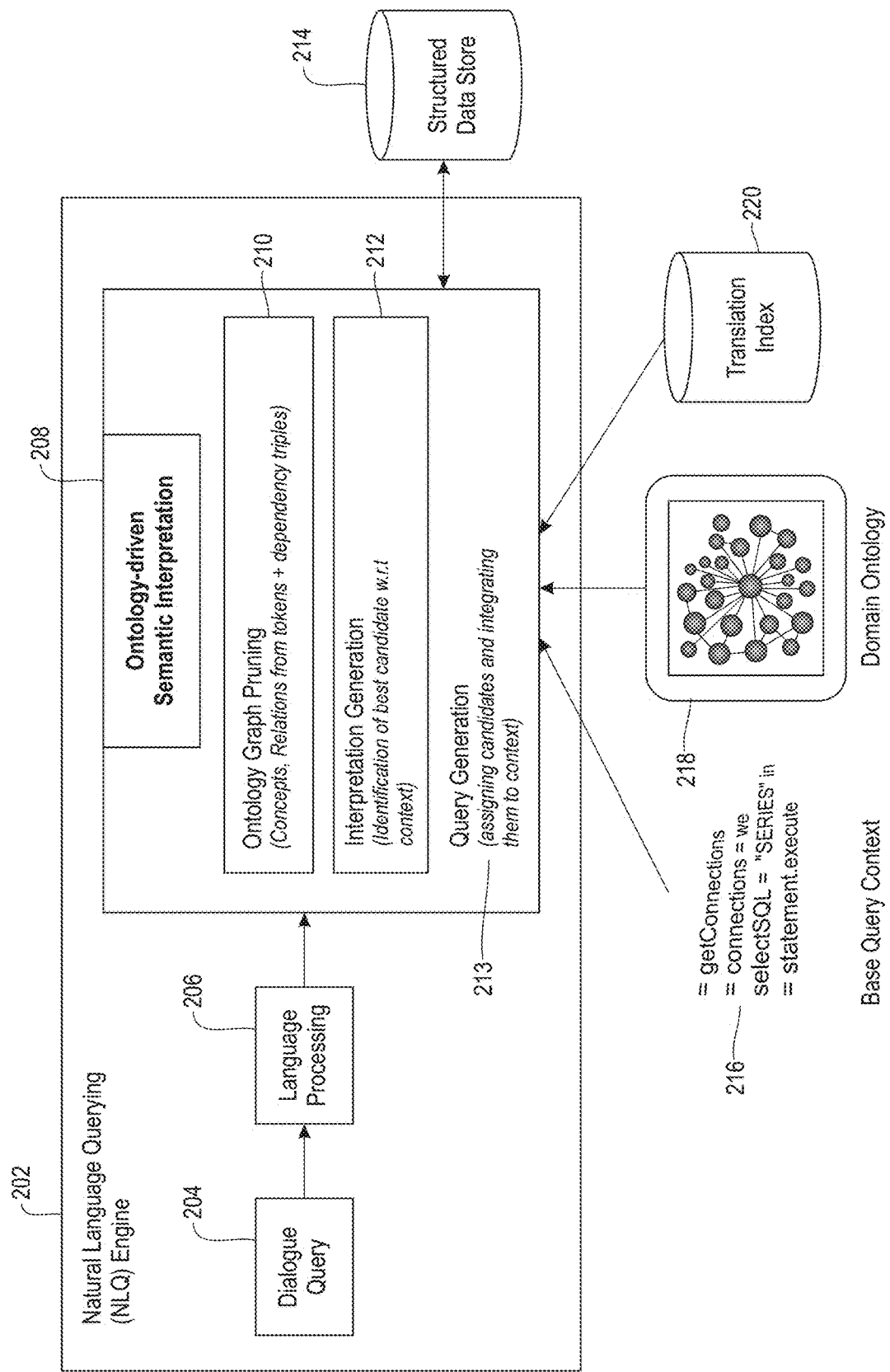
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts an NLQ engine 202, which includes a dialogue query 204, which is processed by a language processing component 206. Also within the NLQ engine 202, the language processing component 206 provides input to an ontology-driven semantic interpretation component 208. In conjunction with the ontology-driven semantic interpretation component 208, FIG. 2 also depicts an ontology graph pruning component 210, an interpretation generation component 212, and a query generation component 213. Additionally, the ontology-driven semantic interpretation component 208 interacts with a structured data store 214, a base query context component 216, a domain ontology component 218 (similar to component 102 in FIG. 1), and a translation index (TI) 220.

The ontology-driven semantic interpretation component 208 takes the output from language processing component 206 and produces a structured query which can be executed over structured data store 214. The ontology graph pruning component 210 takes, as input, query tokens and maps the query tokens to ontology elements using a synonym dictionary. Such actions can prune the entire ontology graph to a sub-graph represented only by ontology elements in the query. Additionally, the interpretation generation component 212 takes such a sub-graph and attempts to find a stored sub-graph which is semantically correct and covers all query tokens. Further, the query generation component 213 then takes the identified stored sub-graph(s) and, based thereon, creates a structured query which can be executed over a database.

In one or more embodiments of the invention, the TI 220 includes an auxiliary service that enables disambiguation of input NLQ text, which in turn enables more general natural language questions. Accordingly, the TI 220 can provide data-awareness as well as support data and meta-data indexing. Meta-data indexing allows efficient searching of the domain ontology 218. Also, the NLQ engine 202 can use the meta-data indexing in TI 220 as additional evidence of ontology property mentions. Additionally, one or more embodiments of the invention can include using an inverted index structure, which provides mapping from data values to data properties in the domain ontology 218, and also provides flexible indexing and matching semantics.

As also illustrated in FIG. 2, the ontology graph pruning component 210, which can include the use of concepts, relations from tokens and dependency triples, etc., can take an ambiguous natural language question and generate candidate interpretations of a dialog query with respect to the domain ontology 218 and the TI 220. Additionally, the interpretation generation component 212, using the base query context 216 and the domain ontology 218, generates the best possible candidate interpretation. Specifically, at least one embodiment of the invention includes choosing the interpretation (that is, the smallest subgraph) which represents the semantics of the query. Further, the query generation component 213, using the best interpretation generated by component 212, integrates the dialog information to the base query, to form a new query. This "new" query can, for example, be a structured query language (SQL) query which can be executed over a database.

Figure 3:
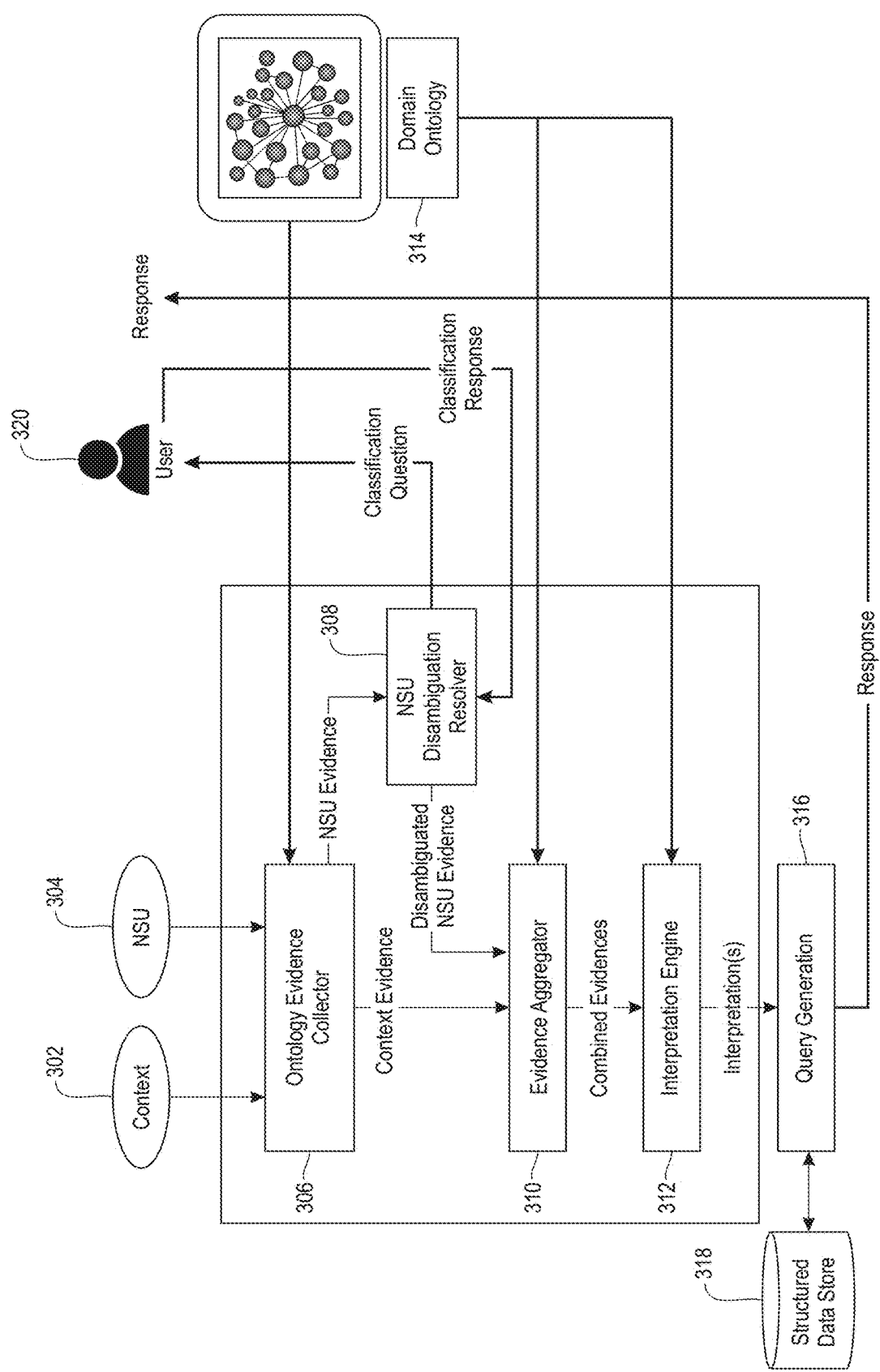
FIG. 3 is a diagram illustrating system architecture, according to an exemplary embodiment of the invention.

FIG. 3 is a diagram illustrating system architecture, according to an exemplary embodiment of the invention. By way of illustration, FIG. 3 depicts context 302 and NSU 304 inputs, which are provided to an ontology evidence collector 306. The ontology evidence collector 306 provides NSU evidence to an NSU disambiguation resolver 308, and provides context evidence to an evidence aggregator 310. NSU evidence can include, for example, query tokens in an NSU matched to corresponding ontology elements. The NSU disambiguation resolver 308, similarly, provides disambiguated NSU evidence to the evidence aggregator 310. For example, if an NSU has two meanings (lender and borrower, for instance), and previous questions were discussing lenders, then the NSU disambiguation resolver 308 can detect such discussion and remove the inconsistent meaning (borrower, in this instance), and thus avoid confusion. Also, the NSU disambiguation resolver 308 can submit a clarification question to the user 320, as well as receive a clarification question response back from the user 320.

The evidence aggregator 310 combines the received evidences and provides combined evidences to an interpretation engine 312. By way merely of example, the evidence aggregator can combine the query "Show me flights from Atlanta to Boston," and the NSU "with meal," to create "(From Flight: Atlanta, To Flight: Boston, Flight meal: yes)." Based on the combined evidences, as well as inputs from a domain ontology 314, the interpretation engine 312 generates one or more query interpretations, and provides the generated interpretations to a query generation component 316. Based on the provided interpretations, as well as inputs from a structured data store 318 (which can contain, for example, tables for storing all required domain information), the query generation component 316 generates a query response and outputs the response to the user 320.

Figure 4:
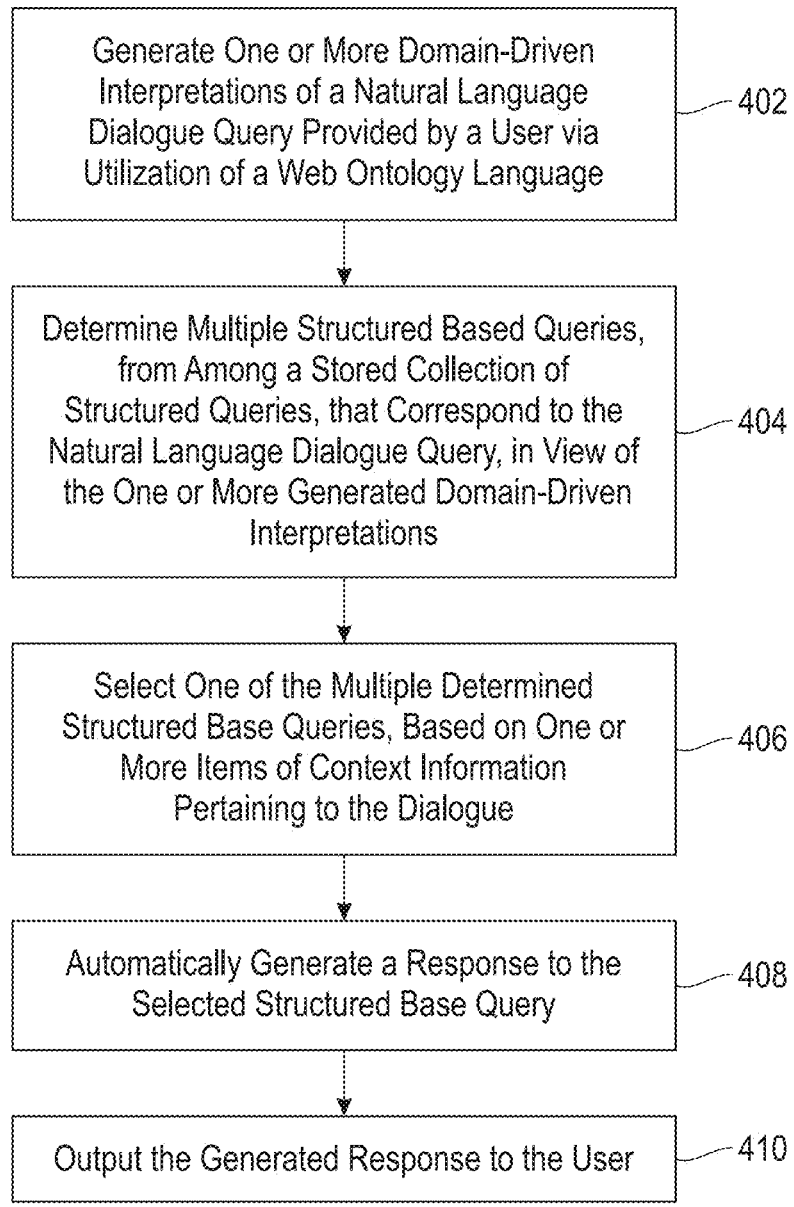
FIG. 4 is a flow diagram illustrating techniques according to an embodiment of the invention.

FIG. 4 is a flow diagram illustrating techniques according to an embodiment of the present invention. Step 402 includes generating one or more domain-driven interpretations of a natural language dialogue query provided by a user via utilization of a web ontology language. Generating one or more domain-driven interpretations of the natural language dialogue query can include using one or more concepts of the web ontology language to relate the natural language dialogue query with one or more of the stored collection of structured queries, using one or more relations of the web ontology language to relate the natural language dialogue query with one or more of the stored collection of structured queries, using one or more properties of the web ontology language to relate the natural language dialogue query with one or more of the stored collection of structured queries, and/or using one or more allowed values of the web ontology language to relate the natural language dialogue query with one or more of the stored collection of structured queries.

Step 404 includes determining multiple structured base queries, from among a stored collection of structured queries, that correspond to the natural language dialogue query, in view of the one or more generated domain-driven interpretations. Determining can include identifying, at run-time, a sub-graph of a knowledge graph pertaining to the web ontology language, wherein the identified sub-graph is applicable for formulating a back-end query to answer the natural language dialogue query. In at least one embodiment of the invention, the natural language dialogue query can include one or more non-sequential utterances provided by the user. In such an embodiment, determining can include determining one or more of the structured queries that are semantically-related to the one or more non-sequential utterances, based on the one or more generated domain-driven interpretations.

Step 406 includes selecting one of the multiple determined structured base queries, based on one or more items of context information pertaining to the dialogue. The one or more items of context information can include interpretation context pertaining to one or more interpretations of a previous natural language dialogue query in the dialogue.

Step 408 includes automatically generating a response to the selected structured base query. Additionally, step 410 includes outputting the generated response to the user.

Also, an additional embodiment of the invention includes generating one or more domain-driven interpretations of a second natural language dialogue query provided by the user via utilization of a web ontology language, wherein the second natural language dialogue query is provided by the user subsequent to the first natural language dialogue query, and wherein the second natural language dialogue query is substantively related to the first natural language dialogue query. Such an embodiment also includes determining multiple structured base queries, from among a stored collection of structured queries, that correspond to the second natural language dialogue query, based on the one or more generated domain-driven interpretations, and selecting one of the multiple determined structured base queries that correspond to the second natural language dialogue query, based on one or more items of context information pertaining to the dialogue, wherein the one or more items of context information comprise the one or more domain-driven interpretations of the first natural language dialogue query. Further, such an embodiment can additionally include automatically generating a response to the selected structured base query that corresponds to the second natural language dialogue query, and outputting, to the user, the generated response to the selected structured base query that corresponds to the second natural language dialogue query.

At least one embodiment of the invention (such as the techniques depicted in FIG. 4, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives a natural language dialogue query sent from a data source to the transmission server. The server can process the information, for example, based upon user-provided user preference information that is stored in memory on the server. Subsequently, an alert is generated containing a response to a translated structured base query. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
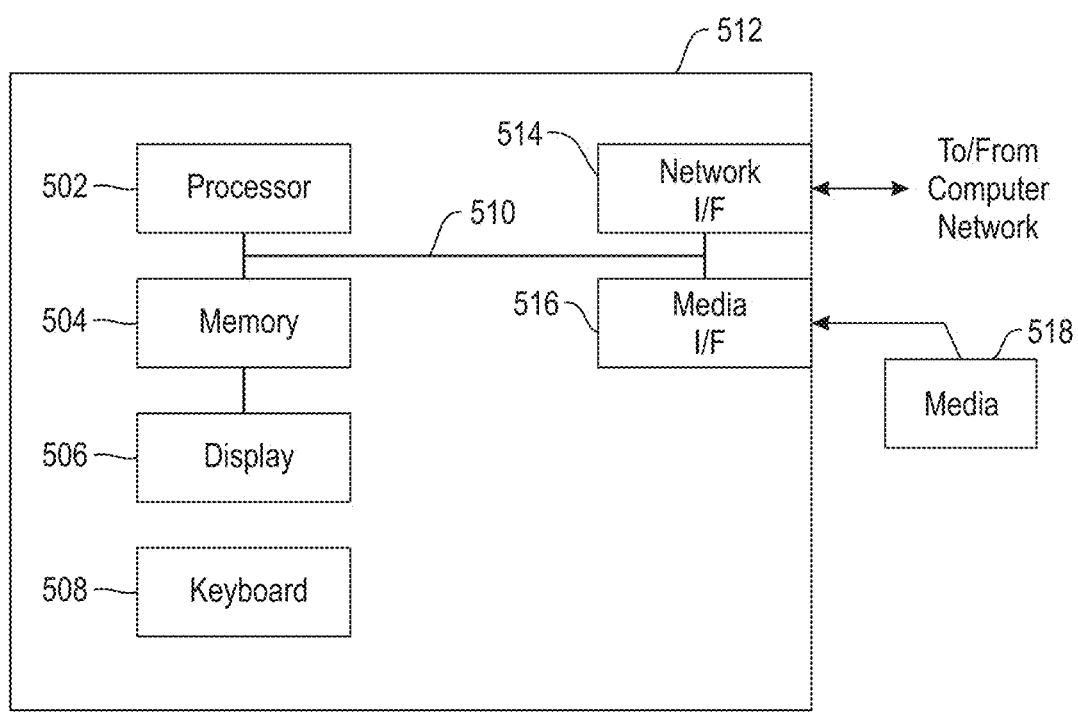
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
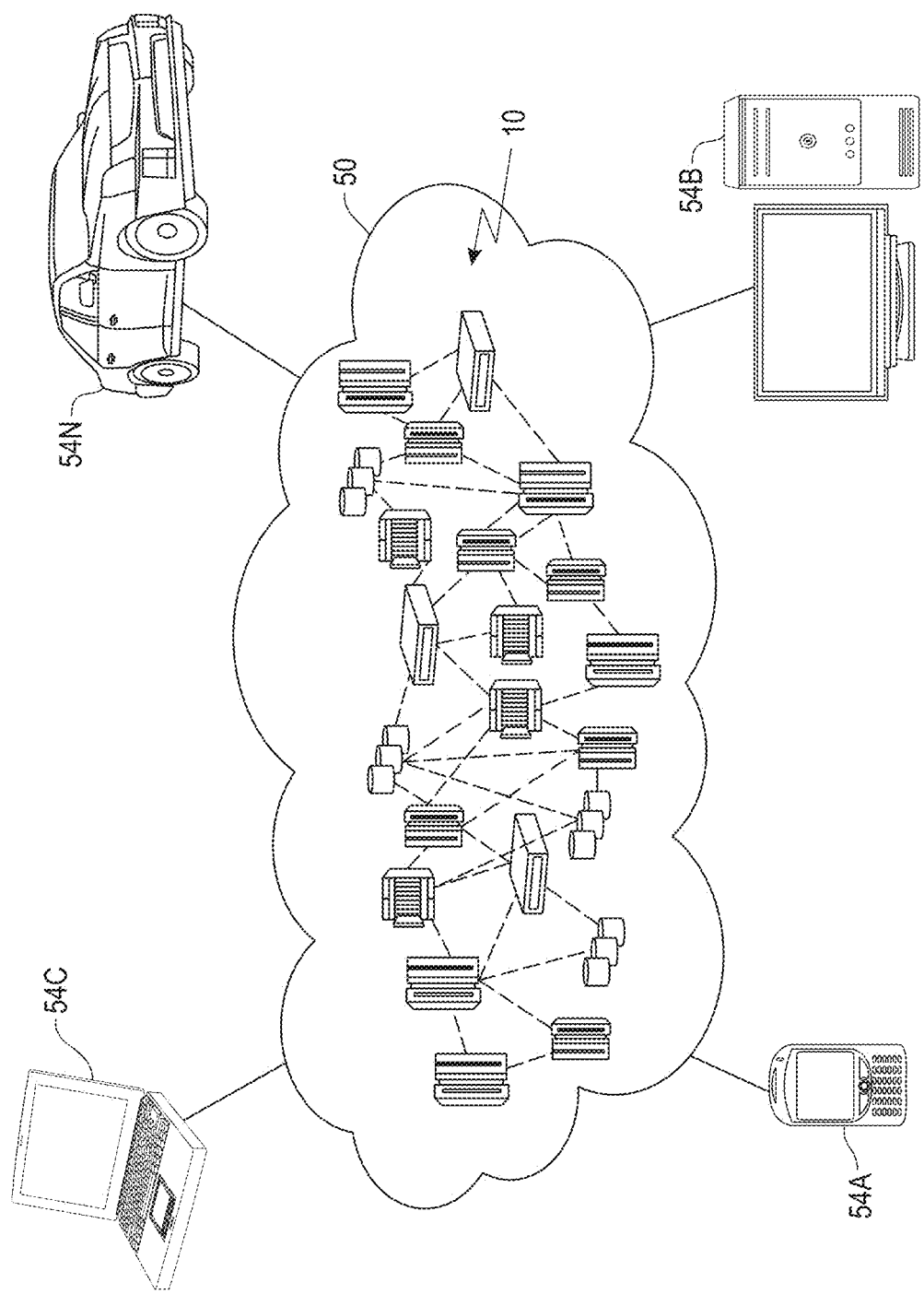
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
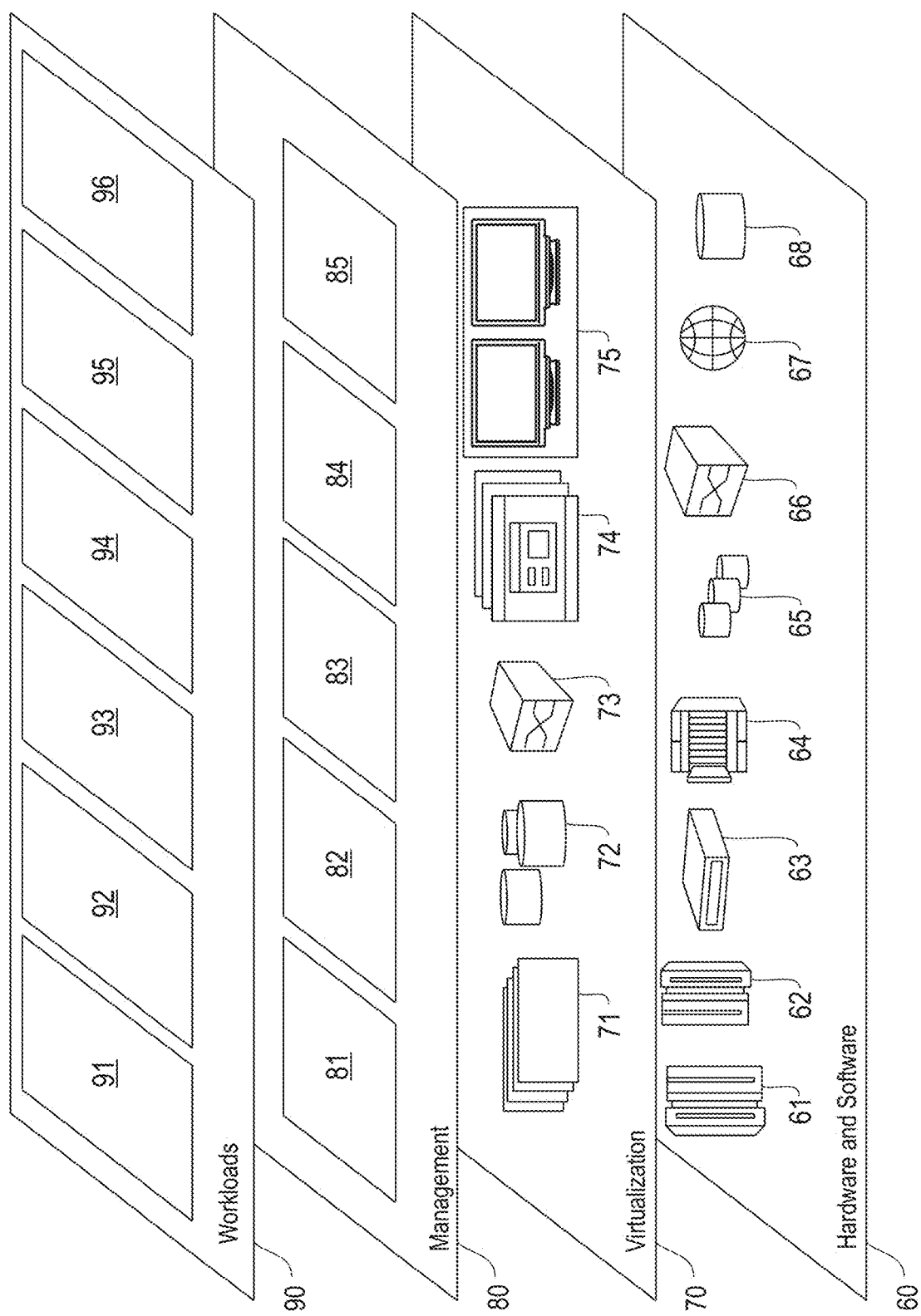
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and natural language interactive dialog 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, utilizing a standard web ontology language for domain-driven interpretation by using concepts, relations, properties, allowed values, etc., to relate a dialog query with a base query.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    generating one or more domain-driven interpretations of a natural language dialogue query provided by a user via utilization of a web ontology language, wherein the natural language dialogue query comprises non-sequential utterances provided by the user, and wherein said generating comprises disambiguating, based at least in part on analysis of past queries, the non-sequential utterances with respect to one or more defaults, one or more named entity values, and one or more context-related items of information;
    determining multiple structured base queries, from among a stored collection of structured queries, that correspond to the natural language dialogue query, in view of the one or more generated domain-driven interpretations, wherein said determining comprises identifying, at run-time, a sub-graph of a knowledge graph pertaining to the web ontology language, wherein the identified sub-graph is applicable for formulating a back-end query to answer the natural language dialogue query;
  selecting one of the multiple determined structured base queries, based on one or more items of context information pertaining to the dialogue;
  automatically generating a response to the selected structured base query; and
  outputting the generated response to the user;
  wherein the steps are carried out by at least one computing device.

2. The computer-implemented method of claim 1, wherein said generating one or more domain-driven interpretations of the natural language dialogue query comprises using one or more concepts of the web ontology language to relate the natural language dialogue query with one or more of the stored collection of structured queries.

3. The computer-implemented method of claim 1, wherein said generating one or more domain-driven interpretations of the natural language dialogue query comprises using one or more relations of the web ontology language to relate the natural language dialogue query with one or more of the stored collection of structured queries.

4. The computer-implemented method of claim 1, wherein said generating one or more domain-driven interpretations of the natural language dialogue query comprises using one or more properties of the web ontology language to relate the natural language dialogue query with one or more of the stored collection of structured queries.

5. The computer-implemented method of claim 1, wherein said generating one or more domain-driven interpretations of the natural language dialogue query comprises using one or more allowed values of the web ontology language to relate the natural language dialogue query with one or more of the stored collection of structured queries.

6. The computer-implemented method of claim 1, wherein said determining comprises determining one or more of the structured queries that are semantically-related to the non-sequential utterances, based on the one or more generated domain-driven interpretations.

7. The computer-implemented method of claim 1, wherein the one or more items of context information comprise interpretation context pertaining to one or more interpretations of a previous natural language dialogue query in the dialogue.

8. A computer program product comprising a computer readable storage medium having program instructions embodied therewith, the program instructions executable by a device to cause the device to:
  generate one or more domain-driven interpretations of a natural language dialogue query provided by a user via utilization of a web ontology language, wherein the natural language dialogue query comprises non-sequential utterances provided by the user, and wherein said generating comprises disambiguating, based at least in part on analysis of past queries, the non sequential utterances with respect to one or more defaults, one or more named entity values, and one or more context-related items of information;
  determine multiple structured base queries, from among a stored collection of structured queries, that correspond to the natural language dialogue query, in view of the one or more generated domain-driven interpretations, wherein said determining comprises identifying, at run-time, a sub-graph of a knowledge graph pertaining to the web ontology language, wherein the identified sub-graph is applicable for formulating a back-end query to answer the natural language dialogue query;
  select one of the multiple determined structured base queries, based on one or more items of context information pertaining to the dialogue;
  automatically generate a response to the selected structured base query; and
  output the generated response to the user.

9. The computer program product of claim 8, wherein said generating one or more domain-driven interpretations of the natural language dialogue query comprises (i) using one or more concepts of the web ontology language to relate the natural language dialogue query with one or more of the stored collection of structured queries, (ii) using one or more relations of the web ontology language to relate the natural language dialogue query with one or more of the stored collection of structured queries, (iii) using one or more properties of the web ontology language to relate the natural language dialogue query with one or more of the stored collection of structured queries, and (iv) using one or more allowed values of the web ontology language to relate the natural language dialogue query with one or more of the stored collection of structured queries.

10. The computer program product of claim 8, wherein said determining comprises identifying, at run-time, a sub-graph of a knowledge graph pertaining to the web ontology language, wherein the identified sub-graph is applicable for formulating a back-end query to answer the natural language dialogue query.

11. The computer program product of claim 8, wherein the natural language dialogue query comprises one or more non-sequential utterances provided by the user, and wherein said determining comprises determining one or more of the structured queries that are semantically-related to the one or more non-sequential utterances, based on the one or more generated domain-driven interpretations.

12. The computer program product of claim 8, wherein the one or more items of context information comprise interpretation context pertaining to one or more interpretations of a previous natural language dialogue query in the dialogue.

13. A system comprising: a memory; and
  at least one processor operably coupled to the memory and configured for:
  generating one or more domain-driven interpretations of a natural language dialogue query provided by a user via utilization of a web ontology language, wherein the natural language dialogue query comprises non-sequential utterances provided by the user, and wherein said generating comprises disambiguating, based at least in part on analysis of past queries, the non-sequential utterances with respect to one or more defaults, one or more named entity values, and one or more context-related items of information;
  determining multiple structured base queries, from among a stored collection of structured queries, that correspond to the natural language dialogue query, in view of the one or more generated domain-driven interpretations, wherein said determining comprises identifying, at run-time, a sub-graph of a knowledge graph pertaining to the web ontology language, wherein the identified sub-graph is applicable for formulating a back-end query to answer the natural language dialogue query;

selecting one of the multiple determined structured base queries, based on one or more items of context information pertaining to the dialogue;

automatically generating a response to the selected structured base query; and outputting the generated response to the user.

14. A computer-implemented method, comprising:

generating one or more domain-driven interpretations of a first natural language dialogue query provided by a user via utilization of a web ontology language, wherein the first natural language dialogue query comprises a first set of non-sequential utterances provided by the user, and wherein said generating the one or more domain-driven interpretations of the first natural language dialogue query comprises disambiguating, based at least in part on analysis of past queries, the first set of non-sequential utterances with respect to one or more defaults, one or more named entity values, and one or more context-related items of information;

determining multiple structured base queries, from among a stored collection of structured queries, that correspond to the first natural language dialogue query, based on the one or more generated domain-driven interpretations of the first natural language dialogue query, wherein said determining comprises identifying, at run-time, a sub-graph of a knowledge graph pertaining to the web ontology language, wherein the identified sub-graph is applicable for formulating a back-end query to answer the natural language dialogue query;

selecting one of the multiple determined structured base queries that correspond to the first natural language dialogue query, based on one or more items of context information pertaining to the dialogue;

automatically generating a response to the selected structured base query that corresponds to the first natural language dialogue query;

outputting, to the user, the generated response to the selected structured base query that corresponds to the first natural language dialogue query;

generating one or more domain-driven interpretations of a second natural language dialogue query provided by the user via utilization of a web ontology language, wherein the second natural language dialogue query comprises a second set of non-sequential utterances provided by the user provided by the user subsequent to the first natural language dialogue query, and wherein the second natural language dialogue query is substantively related to the first natural language dialogue query, and wherein said generating the one or more domain-driven interpretations of the second natural language dialogue query comprises disambiguating, based at least in part on analysis of past queries, the second set of non-sequential utterances with respect to one or more defaults, one or more named entity values, and one or more context-related items of information;

determining multiple structured base queries, from among a stored collection of structured queries, that correspond to the second natural language dialogue query, based on the one or more generated domain-driven interpretations of the second natural language dialogue query;

selecting one of the multiple determined structured base queries that correspond to the second natural language dialogue query, based on one or more items of context information pertaining to the dialogue, wherein the one or more items of context information comprise the one or more domain-driven interpretations of the first natural language dialogue query;

automatically generating a response to the selected structured base query that corresponds to the second natural language dialogue query; and outputting, to the user, the generated response to the selected structured base query that corresponds to the second natural language dialogue query;

wherein the steps are carried out by at least one computing device.

15. The computer-implemented method of claim 14, wherein said determining comprises determining one or more of the structured queries that are semantically-related to the one or more first set of non-sequential utterances, based on the one or more generated domain-driven interpretations.

16. The computer-implemented method of claim 14, wherein said determining comprises determining one or more of the structured queries that are semantically-related to the second set of non-sequential utterances, based on the one or more generated domain-driven interpretations.

* * * * *